No. 672,974. Patented Apr. 30, 1901.
H. A. CLIFFORD.
PHOTOGRAPHIC PLATE OR FILM HOLDER.
(Application filed Oct. 20, 1900.)
(No Model.) 2 Sheets—Sheet 2.
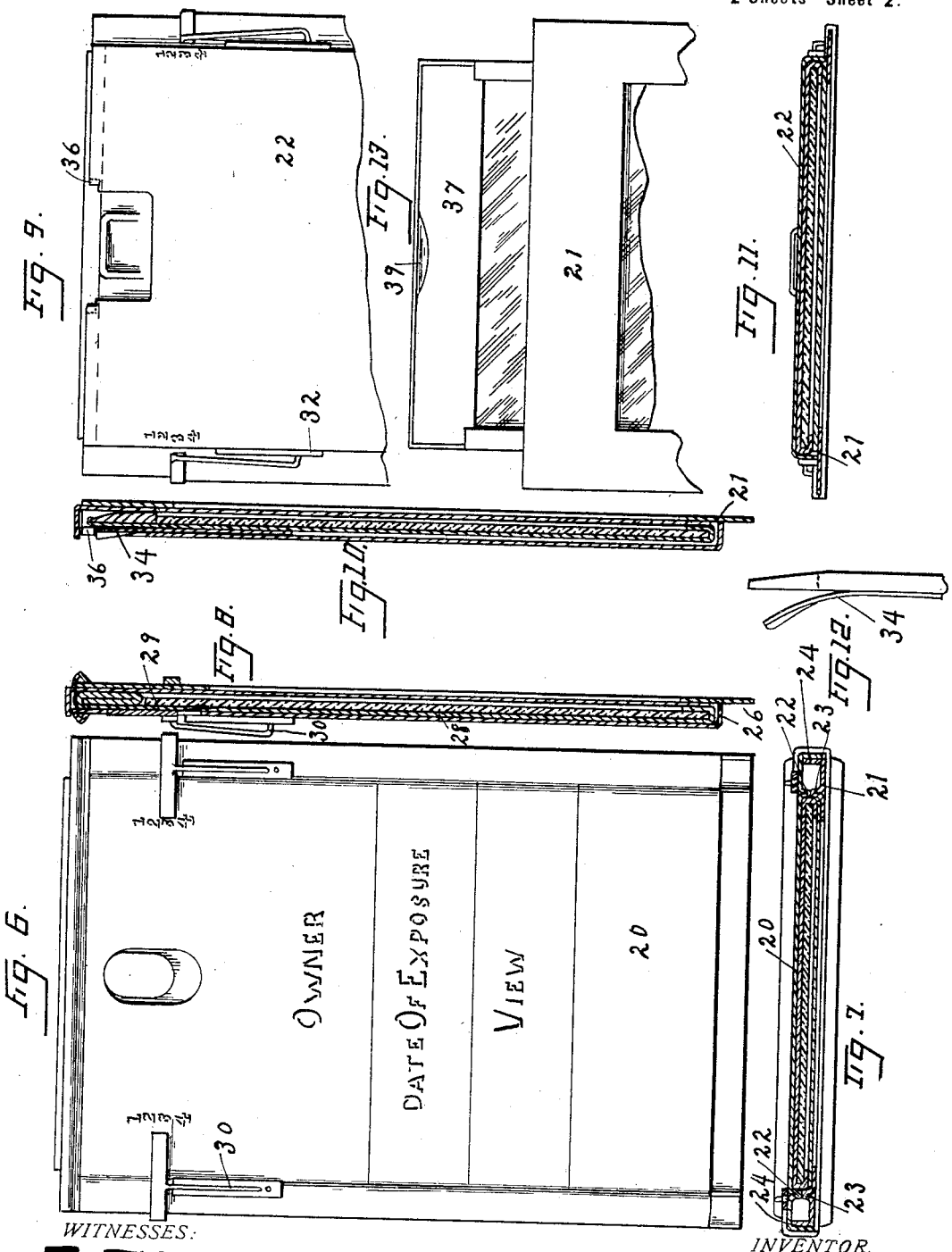
WITNESSES:
W. W. Daniels
J. A. Daniels
INVENTOR.
H. A. Clifford
BY
Francis M. Wright,
ATTORNEY.

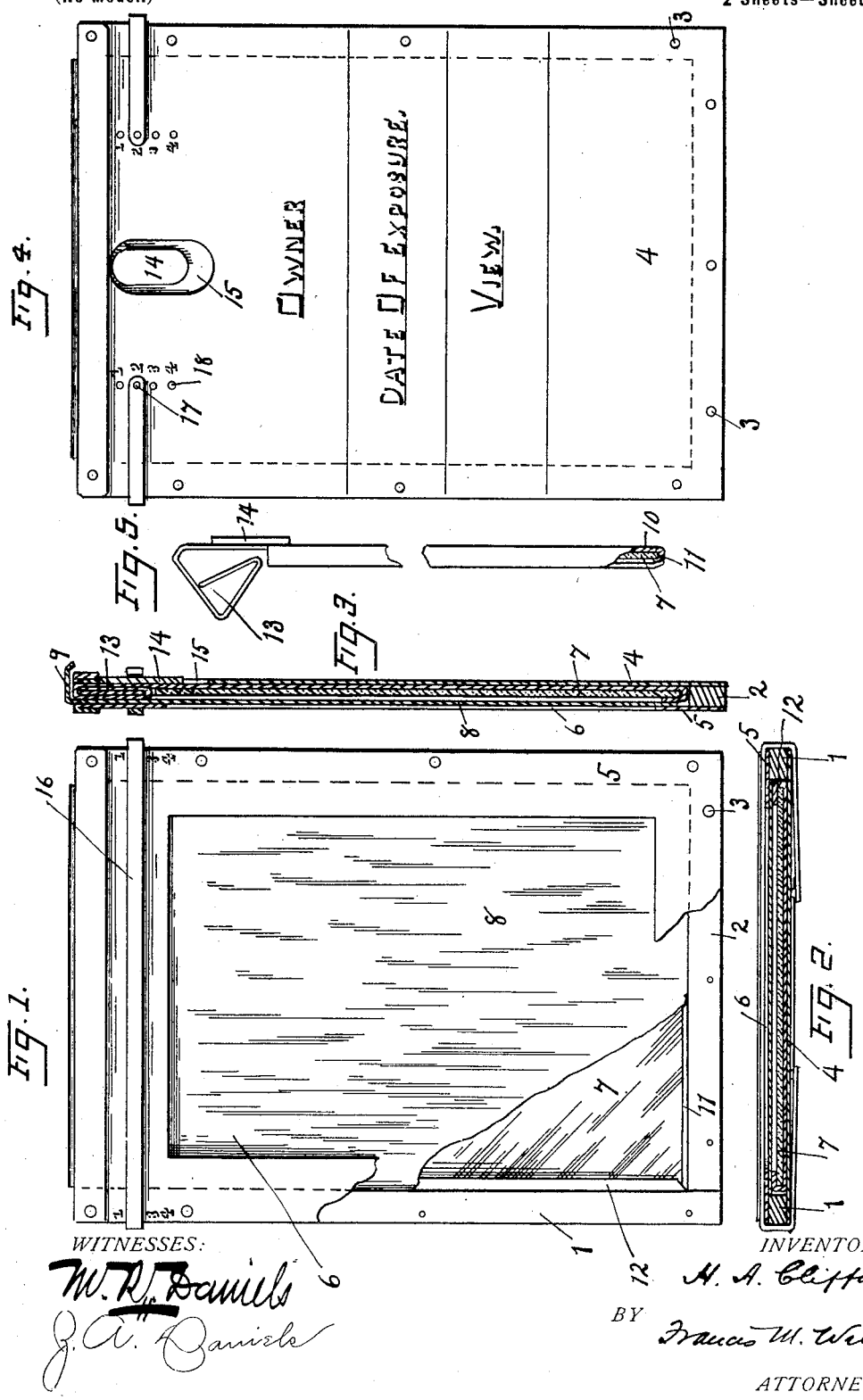

UNITED STATES PATENT OFFICE.

HERSEY A. CLIFFORD, OF SAN FRANCISCO, CALIFORNIA.

PHOTOGRAPHIC PLATE OR FILM HOLDER.

SPECIFICATION forming part of Letters Patent No. 672,974, dated April 30, 1901.

Application filed October 20, 1900. Serial No. 33,795. (No model.)

*To all whom it may concern:*

Be it known that I, HERSEY A. CLIFFORD, a citizen of the United States, residing at San Francisco, in the county of San Francisco and State of California, have invented certain new and useful Improvements in Photographic Plate or Film Holders, of which the following is a specification.

My invention relates to improvements in photographic plate or film holders, one object of my invention being to provide a device of this character which shall be sufficiently cheap in construction to permit of the use of a single holder for each plate or film. To save expense, the holders at present in use are constructed to hold two sensitized plates. This construction is objectionable on account of the trouble entailed in insuring against exposure of the same plate twice, and one object of my invention is to provide a very simple construction of holder, so that the holder can be sold for a comparatively small sum, and thus be cheap enough to be used for only a single plate.

A further object of my invention is to provide a holder which shall be light in weight; also, to provide means for adjusting the holder to different constructions of cameras.

My invention therefore resides in the novel construction, combination, and arrangement of parts for the above ends, hereinafter fully specified, and particularly pointed out in the claims.

In the accompanying drawings, Figure 1 is a front view of the holder, part of the frame and also of the slide being broken away. Fig. 2 is a transverse section thereof. Fig. 3 is a longitudinal section thereof. Fig. 4 is a rear view of the same. Fig. 5 is a detached view, partly broken, of the carrier for a sensitized plate or film. Fig. 6 is a rear view of a modified form of my invention. Fig. 7 is a transverse section of the same. Fig. 8 is a longitudinal central section of the same. Fig. 9 is a broken rear view of another form of the invention. Fig. 10 is a longitudinal section of the same. Fig. 11 is a transverse section thereof looking toward the top. Fig. 12 is a broken side view of the plate-carrier in this modification removed; and Fig. 13 is a broken front view of this form of the device, showing the plate-carrier partly withdrawn.

Referring to the drawings, in the modification illustrated in Figs. 1 to 5, 1 represents the two sides, and 2 the bottom, of the wooden frame of the plate-holder, to which are attached by small tacks 3 the cardboard back 4 and the front 5, the latter having an opening 6 for the exposure of the plate or film 7. In order to strengthen the carrier at the top and rear end, the front and rear pieces 4 5 of the frame have their upper edge bent back or doubled and secured by tacks, as shown, thus stiffening the upper end of the frame. Said plate 7 is normally covered by means of the slide 8, the upper end of which is bent backward, as shown at 9, to form a lip or flange, which may be engaged by the finger to withdraw the slide and make the exposure. 10 is the plate-carrier, which is formed of cardboard, having its lower edge bent upward, as shown at 11, to form a stop for the plate, and its sides bent over or inward, as shown at 12, to form grooves to receive the edges of said plate. The slide 8 slides between the upper surface of said bent edges 12 and the under surface of the front 5. In order to form a cheap and yet effective closure against the entrance of light at the top of the holder, the upper end of the cardboard plate-carrier 10 is folded over several times, as shown at 13, so that said folds constantly tend to spring outward against the under surface of the slide 7 and form an effective stop against the entrance of light at the top of the holder. A small piece of cardboard 14 is secured on the back thereof and serves as a button, engaging the upper edge of an aperture 15, formed in the back 4 of the holder to retain the carrier in place. In order to remove the carrier, all that is necessary is to press down said button 14 until its upper edge passes beneath the level of the upper edge of the aperture 15, this being permitted by reason of the folding of the upper end of the cardboard carrier, and then give an endwise pressure to said button.

It is very desirable to provide a plate-holder which can be adapted to different constructions of cameras within a moderate range. This I accomplish by means of a strip of spring metal 16, which is passed across the front side of the carrier above the exposure-aperture therein and is bent around the edges, its ends lying against the back face of the carrier and the ends thereof carrying pins 17, which engage small recesses 18, formed in the back face of the carrier. This strip being made of spring metal, the pins normally engage said recesses, but are readily removed therefrom when it is desired to move the strip up or down to adjust the device for a camera of a different make.

In Figs. 6, 7, and 8 I have shown a plate-holder the frame of which is made of sheet metal or cardboard and comprising a back plate 20 and a front plate 21. Each plate is formed with two longitudinal folds 22 23, the edges of said folds meeting one another, as shown, and thus forming a guide for the slide and the plate-carrier. The outer edges of the plate 20 21 are bent over and overlap one another, as shown at 24, and are soldered or otherwise secured together, thus making a firm and very stiff construction. The front plate is made somewhat longer than the rear plate, and the space between said plates at the bottom of the holder is closed by means of a small strip 26, suitably formed and soldered or otherwise secured to the rear face of the front plate 20 and to the lower edge of the rear plate 21. The upper ends of the rear plates 20 and 21 are bent back upon themselves twice and the edges are secured to their respective plates, thus making a lip or rim of triangular cross-section and stiffening the upper end of the holder. The slide 8 is of the same construction as in the modification first described, and the carrier is also of the same general construction, except that the body 28 of the carrier is formed of sheet metal, to which is attached at the top a piece of cardboard 29, folded over itself in the same manner as in the first modification. The button for securing the carrier in place is also of the same construction as before. In this form of the device I have shown a slightly-different construction of the top for adjusting the size of the holder to the different makes of cameras. In this case the free ends of the strips 16 are secured to spring-wires 30, which extend downwardly from said strip along the sides of the holder, and the ends of each wire are bent inwardly to engage in succession a number of holes 31, formed in strips of metal 32, secured upon the sides of the carrier.

In Figs. 9, 10, 11, 12, and 13 I have shown a further modification of the invention, in which the holder is formed of a front plate 21, having a suitable aperture for exposure, and a rear plate 22, the edges of which are bent down and soldered or otherwise secured to the rear face of the plate 21. In this case the slide 8 is of the same construction as before, and the carrier is also of the same general construction, except that it has secured on its rear surface a piece of spring sheet metal 34, which normally springs outward or rearwardly from said carrier, and when the carrier is inserted is pressed between the carrier and the rear face of the holder. When said carrier is pushed into place, the upper edge of said spring metal comes beneath teeth 36, bent inwardly from the upper edge of the rear face of the holder, and is then retained in position. In this carrier, in order to sufficiently prevent the entrance of light to a sensitized plate 7 therein, I provide a small strip of wood 37, which lies snugly within the carrier above said plate and is provided with a notch 39, formed in the upper edge thereof, which can be engaged by the finger-nail to draw the upper edge away from the carrier, when it can be readily removed from said carrier. In this construction also the device for adjusting the size of the plate-holder to the size of the camera is slightly modified from that shown in Figs. 6, 7, and 8, in that the strips 32 are secured upon the inwardly-bent edges of the rear plate 20 instead of upon the rear surface of said plate.

I claim—

1. In a photographic plate or film holder, the combination, with the body of the holder, of a strip of suitable material sliding longitudinally upon said holder, and means for retaining the same in place at any one of a series of positions to adjust said holder to the different constructions of cameras, substantially as described.

2. In a photographic plate or film holder, the combination with the body of the holder, of a strip bent around the edges of said holder, the free ends of said strip being located at the rear of the holder and having thereon projections, said holder having holes into which said projections enter to adjust the strip longitudinally upon the holder, substantially as described.

3. In a photographic plate or film holder, a plate-carrier having its top formed of suitable resilient material folded upon itself a plurality of times, the several plaits thereof being disconnected with each other except at the folds, and being free to separate from each other when removed from the holder, whereby a resilient stop is formed against the entrance of light at the top of the holder, substantially as described.

4. In a photographic plate or film holder, the combination with the rear plate of the holder having an aperture, of a plate-carrier having a button secured on the rear surface thereof and entering said aperture to secure the carrier in place, said carrier having a resilient portion attached to the top thereof and folded in front to press said button into said aperture, substantially as described.

5. In a photographic-plate holder, a carrier made out of suitable material having its edges turned over to form grooves for the edges of the sensitized plate, and having its upper end bent upon itself a plurality of times to form a resilient stop for the light at the top of the holder, the several plaits thereof being disconnected with each other except at the folds, and being free to separate from each other when removed from the holder, substantially as described.

6. In a photographic-plate holder, the combination of the wooden three-sided frame, and front and rear pieces of suitable material, the upper ends of said pieces being bent back and secured to the frame to stiffen the upper or open end of the frame, substantially as described.

7. A photographic-plate holder comprising front and rear pieces of suitable material both having inward folds parallel with the long sides of the holder and at a distance therefrom and meeting each other to form guides for the plate-carrier in said plate-holder, substantially as described.

In witness whereof I have hereunto set my hand in the presence of two subscribing witnesses.

H. A. CLIFFORD.

Witnesses:
 FRANCIS M. WRIGHT,
 Z. A. DANIELS.